United States Patent
Kamei

(10) Patent No.: US 9,826,163 B2
(45) Date of Patent: Nov. 21, 2017

(54) IMAGE PROCESSING APPARATUS, CONTROL METHOD, AND RECORDING MEDIUM

(71) Applicant: CANON KABUSHIKI KAISHA, Tokyo (JP)

(72) Inventor: Yoichi Kamei, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 82 days.

(21) Appl. No.: 14/281,728

(22) Filed: May 19, 2014

(65) Prior Publication Data

US 2014/0347517 A1    Nov. 27, 2014

(30) Foreign Application Priority Data

May 22, 2013 (JP) .................................. 2013-108257

(51) Int. Cl.
| | | |
|---|---|---|
| H04N 5/222 | (2006.01) | |
| H04N 5/262 | (2006.01) | |
| G09G 5/08 | (2006.01) | |
| H04N 5/232 | (2006.01) | |

(52) U.S. Cl.
CPC ..... H04N 5/23293 (2013.01); H04N 5/23206 (2013.01); H04N 5/23229 (2013.01)

(58) Field of Classification Search
CPC .............. H04N 5/23293; H04N 5/772; H04N 2101/00; H04N 21/4223; H04N 5/23245; H04N 5/445; G06F 3/0488; G06F 3/04883; G06F 3/14; G06F 9/4443; G09G 2370/16; G09G 2310/024; G09G 2370/022; G09G 2370/18

USPC ....... 348/207.1, 220.1, 222.1, 231.6, 330.01, 348/330.02, 333.11; 345/157, 204
See application file for complete search history.

(56) References Cited

U.S. PATENT DOCUMENTS

| | | | | |
|---|---|---|---|---|
| 7,286,160 | B2* | 10/2007 | Ejima ................ | H04N 1/00005 |
| | | | | 348/135 |
| 2001/0052928 | A1* | 12/2001 | Imagawa ............... | H04N 7/142 |
| | | | | 348/14.12 |
| 2002/0015098 | A1* | 2/2002 | Hijishiri ............... | H04N 1/0044 |
| | | | | 348/207.99 |

(Continued)

FOREIGN PATENT DOCUMENTS

| | | |
|---|---|---|
| EP | 1158801 A2 | 11/2001 |
| JP | 2004015362 A | 1/2004 |

(Continued)

*Primary Examiner* — Trung Diep
(74) *Attorney, Agent, or Firm* — Canon U.S.A., Inc. IP Division

(57) ABSTRACT

An image processing apparatus includes a setting unit configured to set, in a first range encompassing an area of a captured image acquired by an imaging unit, a first analysis graphic or a first line on a display screen displaying the first analysis range, and set, in the first setting range, a display range of the captured image to be displayed on a display unit, and a determination unit configured, when the display range is such that the first graphic or the first line set in the first range is partially located outside the display range, to determine a second analysis graphic having a number of vertexes equal to or smaller than a number of vertexes of the first analysis graphic, and contained within the display range or a second line contained within the display range.

28 Claims, 9 Drawing Sheets

(56) References Cited

U.S. PATENT DOCUMENTS

| | | | |
|---|---|---|---|
| 2005/0052928 A1* | 3/2005 | Koshikawa | G11C 11/406 365/222 |
| 2009/0189903 A1 | 7/2009 | Imai | |
| 2010/0097488 A1 | 4/2010 | Suzuki | |
| 2010/0149378 A1* | 6/2010 | Suzuki | H04N 5/232 348/231.99 |
| 2010/0199214 A1 | 8/2010 | Mikawa | |
| 2013/0069980 A1* | 3/2013 | Hartshorne | G09G 5/00 345/620 |

FOREIGN PATENT DOCUMENTS

| | | |
|---|---|---|
| JP | 2005-312018 A | 11/2005 |
| JP | 2007036782 A | 2/2007 |
| JP | 2007233919 A | 9/2007 |
| JP | 2008035095 A | 2/2008 |
| JP | 2010-103676 A | 5/2010 |
| JP | 2010136095 A | 6/2010 |

* cited by examiner

IMAGE PROCESSING APPARATUS, CONTROL METHOD, AND RECORDING MEDIUM

BACKGROUND OF THE INVENTION

Field of the Invention

The present invention relates to an image processing apparatus configured to analyze a video image, and, in particular, to a setting of a region in which a video image is analyzed.

Description of the Related Art

Conventionally, it has been possible to analyze a captured image, based on a result of detection of a change in an object in a video image, to detect: whether the object is moving in the captured image, whether the object is left behind, whether the object is carried away, whether the object has passed across a predetermined region, whether any mischief is made on a camera, and the like. Further, it has been possible to track the object in the captured image based on the result of the detection of the change.

Japanese Patent Application Laid-Open No. 2005-312018 discusses a method according to which, when analyzing a captured image acquired by a network camera, an image processing apparatus specifies only a part of a region in the captured image as an analysis region to analyze the image within the specified region.

Further, Japanese Patent Application Laid-Open No. 2010-103676 discusses a method in which a network camera switches an aspect ratio of a captured image to be output, or switches an aspect ratio of a captured image to be recorded in recording processing.

Japanese Patent Application Laid-Open No. 2010-103676 discusses a method according to which the camera switches a range to be actually displayed on a display device, within an imageable range in the captured image as a method for switching the aspect ratio of the captured image.

Japanese Patent Application Laid-Open No. 2010-103676 discusses an example in which the camera switches the aspect ratio of the captured image to be displayed from 16:9 to 4:3. Japanese Patent Application Laid-Open No. 2010-103676 discusses that, in this example, the camera changes the aspect ratio of the captured image to be displayed to 4:3 by refraining from displaying left and right portions of a region in the captured image that was displayed when the aspect ratio was 16:9.

Not only in this example but also in some other cases, changing the size of the captured image to be displayed on the display device may result in disappearance of a part of the image that was displayed before the change. Alternatively, displaying the captured image while changing the size of the captured image to be displayed may result in appearance of an image that was not displayed before the change.

The analysis method discussed in Japanese Patent Application Laid-Open No. 2005-312018 has not been contrived in consideration of these cases in which a display range of the captured image (for example, the aspect ratio of the captured image) is changed after the analysis region is specified. If the display range of the captured image is changed after the analysis region is specified, the analysis region may have to be specified again.

For example, the following problem may arise if a change in the aspect ratio of the captured image to be displayed results in disappearance of a part of the captured image that was displayed before the change. In this case, if the analysis region is at least partially contained within this range that becomes undisplayed, the range of the analysis region also has to be reduced.

Further, for example, the following problem may arise if a change in the aspect ratio of the captured image to be displayed results in appearance of the captured image that was not displayed before the change. In this case, if a user wants to also set the analysis region in this range that becomes displayed, the range of the analysis region has to be set again.

Further, for a setting of a detection line for use in passage detection processing, for detecting that an object has passed across a predetermined line, the detection line may also have to be set again according to the change in the display range of the captured image.

Requiring the user to specify the analysis region or the detection line again each time the display range of the captured image is changed causes the user to perform cumbersome processing.

SUMMARY OF THE INVENTION

According to an aspect of the present invention, an image processing apparatus includes a setting unit configured to set, in a first range an imaging unit acquires a captured image, a first graphic or a first line on a display screen displaying the first range, and set, in the first range, a display range of the captured image to be displayed on a display unit; and a determination unit configured to determine a second graphic having a number of vertexes equal to or smaller than a number of vertexes of the first graphic and contained within the display range, or a second line contained within the display range, when the display range is changed in such a manner that the first graphic or the first line set in the first range is partially located outside the display range.

Further features of the disclosure will become apparent from the following description of exemplary embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Figure 1:
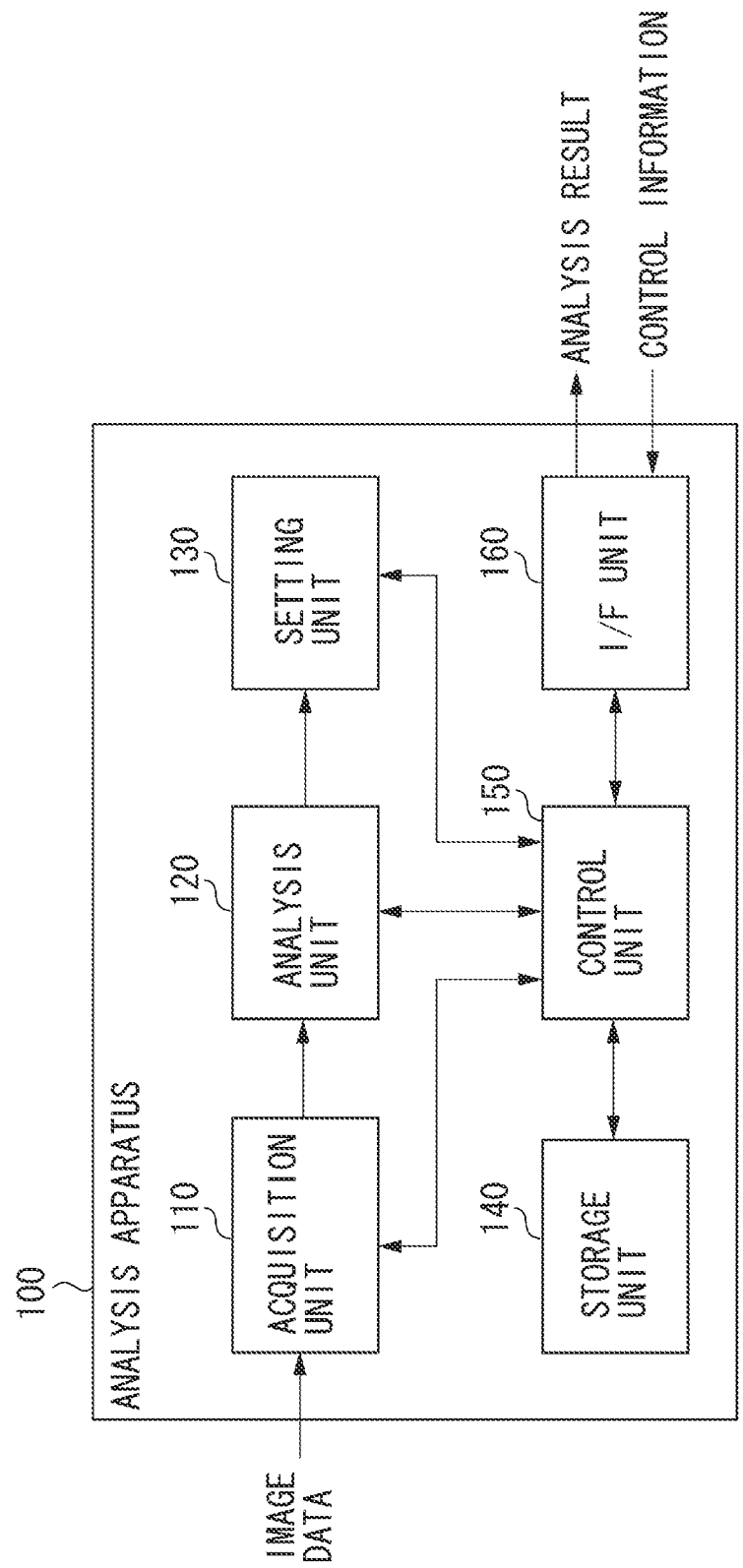
FIG. 1 is a block diagram illustrating a configuration of an analysis apparatus according to a first exemplary embodiment of the present invention.

Various exemplary embodiments, features, and aspects of the invention will be described in detail below with reference to the drawings.

An analysis apparatus 100 according to a first exemplary embodiment of the present invention will be described. This analysis apparatus 100 is an image processing apparatus configured to analyze a captured image acquired by an imaging apparatus. The analysis apparatus 100 is, for example, provided in the imaging apparatus. The analysis apparatus 100 outputs a result of the image analysis to a receiving apparatus via a network.

Alternatively, the analysis apparatus 100 may acquire image data from an external apparatus and then analyze the acquired data. For example, the analysis apparatus 100 may be provided in the receiving apparatus that receives the captured image acquired by the imaging apparatus via the network. In this case, the analysis apparatus 100 analyzes the captured image received by the receiving apparatus, and outputs a result of the image analysis.

A configuration of the analysis apparatus 100 according to the present exemplary embodiment will be described with reference to a block diagram illustrated in FIG. 1. The analysis apparatus 100 includes an acquisition unit 110, an analysis unit 120, a setting unit 130, a storage unit 140, a control unit 150, and an interface unit 160.

The acquisition unit 110 acquires image data. The image data acquired by the acquisition unit 110 corresponds to a display range of the captured image to be displayed on a display device (not shown) connected to the analysis apparatus 100. The image data acquired by the acquisition unit 110 is subjected to analysis processing performed by the analysis unit 120, which will be described below. In the present exemplary embodiment, the acquisition unit 110 can acquire a plurality of image data having different image data sizes (hereinafter referred to as "image sizes"). The acquisition unit 110 further acquires the image size of the acquired image. Examples of the types of the image size include a resolution of the acquired image.

If the analysis apparatus 100 is provided in the imaging apparatus, the acquisition unit 110 inputs, for example, image data (the captured image) captured by an imaging unit (not shown) of the imaging apparatus which is converted into a digital signal by an analog/digital (A/D) conversion circuit (not shown), into the analysis unit 120. The imaging unit includes a lens, an image sensor, and the like. A charged coupled device (CCD) sensor, a complementary metal oxide semiconductor (CMOS) sensor, or the like is used as the image sensor.

In this case, the image size of the image data to be acquired by the acquisition unit 110 can be changed by changing a range where data is read out from the image sensor of the imaging unit. Alternatively, the image size of the image data to be acquired by the acquisition unit 110 can be changed by changing a region to be converted into the digital signal by the A/D conversion circuit, within the image data captured by the imaging unit.

If the analysis apparatus 100 acquires the image data from an external apparatus, the acquisition unit 110 can include a plurality of physical interfaces for acquiring the image data from the external apparatus. The acquisition unit 110 may be configured to determine the image size of the acquired image data, according to which physical interface is used to input the image data among the plurality of physical interfaces.

For example, if the acquisition unit 110 includes a Radio Cooperation of America (RCA) terminal and High-Definition Multimedia Interface (HDMI) (registered trademark) as the physical interfaces, the acquisition unit 110 operates in the following manner. When the image data is acquired from the RCA terminal, the acquisition unit 110 inputs the image data into the analysis unit 120 in such a manner that the image data has an image size of 640×480 pixels. Further, when the image data is acquired from HDMI (registered trademark), the acquisition unit 110 inputs the image data into the analysis unit 120 in such a manner that the image data has an image size of 1920×1080 pixels. In this manner, the image size of the image data to be input into the analysis unit 120 can be acquired according to the type of the physical interface used to acquire the image data.

Further, the acquisition unit 110 can acquire the image data via a local area network (LAN) using Ethernet (registered trademark) or the like. For example, the acquisition unit 110 can acquire the image data from a network camera, or an image data storage apparatus connected to the network (the LAN or the like) via the LAN.

If the acquisition unit 110 acquires the image data from the network camera, the acquisition unit 110 can communicate with the network camera to determine the image size of the image data acquired from the network camera. Similarly, if the acquisition unit 110 acquires the image data from the storage apparatus connected to the network, the acquisition unit 110 can also communicate with the storage apparatus to determine the image size of the image data acquired from the storage apparatus.

The analysis unit 120 performs the analysis processing on the image data, acquired by the acquisition unit 110, according to an instruction from the control unit 150, which will be described below. In the present exemplary embodiment, the analysis unit 120 can perform object detection processing within a range of an analysis region determined by the control unit 150 in the image data acquired by the acquisition unit 110. The object detection processing is processing for detecting an object in the captured image.

Further, in the present exemplary embodiment, the analysis unit 120 can perform passage detection processing for detecting that an object has passed across a predetermined detection line determined by the control unit 150 in the display range of the image data acquired by the acquisition unit 110. The present exemplary embodiment will be described based on an example in which the analysis unit 120 can perform the object detection processing and the passage detection processing, but the analysis unit 120 may be configured to perform only any one of the object detection processing and the passage detection processing. Further, the analysis processing performed by the analysis unit 120 is not limited to the object detection processing and the passage detection processing.

The analysis unit 120 can perform, for example, pattern matching processing within the range of the analysis region determined by the control unit 150 as the object detection processing. The pattern matching processing is processing for detecting an object having a shape corresponding to a pattern image that indicates a predetermined shape from the image data. An object having a specific shape can be detected from the image data by the pattern matching processing.

Further, for example, the analysis unit 120 can detect a moving object within the range of the analysis region determined by the control unit 150 with use of an inter-frame subtraction method, or a background subtraction method, as the object detection processing. The inter-frame subtraction method is a method according to which a plurality of frame images in a video image is compared to one another so that a region having a difference between images of these frames is detected as a region where a change occurs. Further, the background subtraction method is a method according to which a frame image in a video image is compared with a predetermined background image so that a region having a difference between the frame image in the video image and the background image is detected as a region where a change occurs.

The analysis unit 120 can also perform analysis processing such as detection of whether an object is left behind, detection of whether an object is carried away, detection of whether any mischief is made on the camera, or detection of whether an object has passed across a predetermined line or region, in addition to the detection of a moving object, based on a change in the display image of the image data.

The detection of whether an object is left behind is processing for detecting that, from the time that the object is placed at a predetermined position in a video image, a predetermined time period has elapsed with the object maintained at this position. The detection of whether an object is carried away is processing for detecting that, from the time the object placed at a predetermined position in a video image is lost from the predetermined position, a predetermined time period has elapsed with the object still lost from the position. The detection of whether any mischief is made on the camera is processing for detecting that, from a time a predetermined change has occurred in a region having a size of a predetermined value or larger on a display screen of the image data, a predetermined time period has elapsed with this predetermined change remaining. Further, the detection of whether an object has passed across a predetermined line or region is processing for detecting that the object has passed across the detection line, or the detection region set in the display image of the image data.

The setting unit 130 sets a range that encompasses image data of all sizes that the acquisition unit 110 can acquire (hereinafter referred to as a "setting range"). Further, the setting unit 130 sets a graphic for determining the analysis processing (hereinafter referred to as an "analysis graphic") within a frame that indicates the setting range. The setting range can be, for example, an imageable range of the imaging unit that acquires the captured image. Alternatively, the setting range can be, for example, a region corresponding to a display range of specific image data among image data that the acquisition unit 110 can acquire. The present exemplary embodiment will be described based on an example in which the acquisition unit 110 can acquire first image data, and second image data having an image size that encompasses the first image data, and a region corresponding to the second image data is set as the setting range.

Further, in the present exemplary embodiment, the analysis graphic includes a graphic that indicates the range where the analysis unit 120 performs the above-described object detection processing. Further, the analysis graphic includes the detection line used when the analysis unit 120 performs the passage detection processing. A setting value set by the setting unit 130 is stored in the storage unit 140, which will be described below.

The setting unit 130 can set the analysis region by, for example, setting coordinate values that indicate the analysis region in a coordinate system (which will be described below with reference to FIG. 3) representing the setting range. If a polygon is used as the analysis region, the analysis region can be set by specifying coordinate values of each vertex of the analysis region. On the other hand, if a rectangle is used as the analysis region, the analysis region may be set based on central coordinates and a length of a diagonal line of the analysis region. In this case, alternatively, the analysis region may be set based on coordinate values of a single vertex and the length of the diagonal line of the analysis region. Further alternatively, the analysis region may be specified based on coordinate values of a single vertex, a vertical length, and a horizontal length of the analysis region. On the other hand, if a circle is used as the analysis region, the analysis region may be specified based on coordinate values of a center and a diameter of the circle. The method for setting the analysis region is not limited specifically.

Further, the setting unit 130 can set the detection line by, for example, setting coordinate values that indicate the detection line (coordinates of both ends of the detection line, or the like) in the coordinate system representing the setting range. In the present exemplary embodiment, the detection line is defined by specifying two end points in the setting range. The setting unit 130 may be configured to be able to set the detection line by connecting a plurality of detection lines each defined by specifying two end points. In this manner, an object that has passed across a polygonal line constituted by a plurality of detection lines can be detected.

Now, the coordinate system representing the setting range will be described with reference to FIG. 3. The present exemplary embodiment will be described based on an example in which the acquisition unit 110 can acquire the first image data, and the second image data having an image size that encompasses the first image data, and the region corresponding to the display range of the second image data is set as the setting range. The setting range in the present exemplary embodiment is not limited to this example, and the imageable range where the imaging apparatus can capture an image may be set as the setting range.

Figure 3:
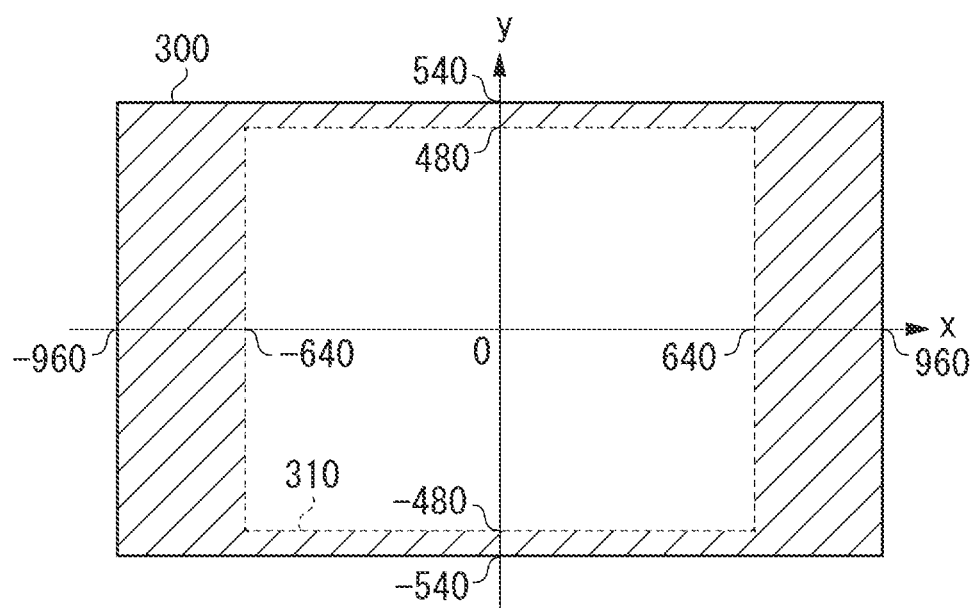
FIG. 3 illustrates a coordinate system that indicates an analysis region according to exemplary embodiments of the present invention.

FIG. 3 illustrates display ranges of image data having two types of image sizes that the acquisition unit 110 can acquire. In the example illustrated in FIG. 3, a rectangular frame 300 indicates a display range of image data (the second image data) having the image size of 1920×1080 pixels. Further, in the example illustrated in FIG. 3, a rectangular frame 310 indicates a display range of image data (the first image data) having an image size of 1280×960 pixels. As illustrated in FIG. 3, the rectangular frame 300 encompasses the rectangular frame 310. In the example illustrated in FIG. 3, the rectangular frame 300 corresponds to the above-described setting range.

In the example illustrated in FIG. 3, the display ranges of the respective image data are illustrated in such a manner that a center of the rectangular frame 300 and a center of the rectangular frame 310 coincide with each other. In the example illustrated in FIG. 3, the center of the rectangular frame 300 can be an intersection point between a perpendicular bisector of one of sides of the rectangular frame 300 that extends in parallel with an X axis (a horizontal side), and a perpendicular bisector of a side that extends in parallel with a Y axis (a vertical side). Alternatively, the center of the rectangular frame 300 can be an intersection point between diagonal lines of the rectangular frame 300.

In the coordinate system illustrated in FIG. 3, an origin of the coordinate system is set to the point at which the center of the rectangular frame 300 and the center of the rectangular frame 310 coincide with each other. However, the position of the origin is not limited to the center of the rectangular frame 300. The origin of the coordinate system may be set to a vertex of the rectangular frame 300 or the rectangular frame 310.

In the example illustrated in FIG. 3, the X axis represents the number of pixels in the image data acquired by the acquisition unit 110 in a horizontal direction. Further, in the example illustrated in FIG. 3, the Y axis represents the number of pixels in the image data acquired by the acquisition unit 110 in a vertical direction.

A shaded portion in FIG. 3 represents a region where the rectangular frame 300 and the rectangular frame 310 do not overlap each other. In other words, the shaded portion represents a display range that will disappear on the display device if the acquired image data is switched from the larger image data, having the image size of 1920×1080 pixels, to the smaller image data, having the image size of 1280×960 pixels. The image sizes described with use of the rectangular frame 300 and the rectangular frame 310 are merely an example, and the image sizes are not limited to these examples.

The rectangular frame 300 and the rectangular frame 310 may have such image sizes that only left and right portions of the rectangular frame 300 do not overlap the rectangular frame 310. For example, the image size of the image indicated by the rectangular frame 300 may be set to 1920×1080 pixels (the aspect ratio 16:9), and the image size of the image indicated by the rectangular frame 310 may be set to 1440×1080 pixels (the aspect ratio 4:3). Similarly, the rectangular frame 300 and the rectangular frame 310 may have such image sizes that only top and bottom portions of the rectangular frame 300 do not overlap the rectangular frame 310.

The setting unit 130 can set the analysis graphic in a display range of image data having a larger image size (in the range of the rectangular frame 300 in the example illustrated in FIG. 3), among the plurality of image data having different image sizes that the acquisition unit 110 can acquire. Examples of the analysis graphic include a graphic representing the analysis region that indicates the range where the analysis processing is performed in the image data, and a graphic representing the detection region to be used for performing the passage detection processing.

In other words, the analysis region or the detection line can be set with the analysis region or the detection line partially or entirely overlapping the shaded portion illustrated in FIG. 3. An example of setting the analysis region will be described below with reference to FIGS. 4A and 4B.

The storage unit 140 stores the setting value of the analysis region set by the setting unit 130. For example, the storage unit 140 stores positional information that indicates a position of each vertex of the analysis graphic in the imageable range of the imaging apparatus. Further, for example, the storage unit 140 stores positional information that indicates a position of each vertex of the analysis graphic in a second display range, which is the display range of the captured image to be displayed on the display device and contains the analysis graphic. In the present exemplary embodiment, a vertex of the analysis graphic is defined to include an end point of the detection line. For example, the storage unit 140 stores positional information that indicates a position in the imageable range with respect to each end point of a first line, which is a line defined by specifying two end points, or a line formed by connecting a plurality of lines each defined by specifying two end points. Further, for example, the storage unit 140 stores positional information that indicates a position of each end point of the first line in the display range of the second image data that contains the first line.

Further, if the control unit 150, which will be described below, includes a built-in processor such as a central processing unit (CPU), the storage unit 140 stores a program to be executed by this processor. Further, the storage unit 140 is used as a work area that the analysis unit 120 and the control unit 150 use to perform the processing. The storage unit 140 can include, for example, a random access memory (RAM) or a read only memory (ROM). A removable medium such as a memory card may be used as the storage unit 140. Further, the storage unit 140 may include an external storage device as a part or a whole thereof. The storage unit 140 can include a plurality of storage media.

The control unit 150 controls an operation of each unit of the analysis apparatus 100 illustrated in FIG. 1. The control unit 150 can include, for example, a processor such as a CPU. If the control unit 150 is configured to include a processor, the control unit 150 controls the operation of each unit of the analysis apparatus 100 illustrated in FIG. 1 by reading out and executing the program stored in the storage unit 140.

The interface unit 160 (hereinafter referred to as the I/F unit 160) outputs an analysis result of the analysis unit 120. Further, the I/F unit 160 inputs the setting value into the setting unit 130. For example, the I/F unit 160 is configured as a signal input/output terminal. For example, the I/F unit 160 can receive an input of a signal from an input device such as a keyboard, a touch panel, or a mouse. Further, the I/F unit 160 can output the analysis result of the analysis unit 120 to the display device, and the like. Further, the I/F unit 160 may be configured to communicate with an external input/output terminal by sharing Ethernet (registered trademark) with the acquisition unit 110.

For example, the analysis apparatus 100 may be a camera server configured to analyze a captured image acquired by the imaging unit of the network camera. The captured image acquired by the imaging unit is input to the acquisition unit 110. After performing the image analysis processing that will be described below, the analysis apparatus 100 outputs an analysis result to a client apparatus via the network. The analysis result is output from the I/F unit 160 to the client apparatus via the network. Further, the I/F unit 160 receives a setting command for performing the analysis processing from the client apparatus. For example, the I/F unit 160 receives setting information of an analysis graphic (for example, coordinates of an analysis graphic in the captured image input by the acquisition unit 110) specified by a user on a display screen of the client apparatus. The control unit 150 sets the received setting information to the analysis unit 120. The analysis unit 120 performs the image analysis processing, which will be described below, based on the setting value set by the control unit 150.

Alternatively, the analysis apparatus 100 may be a client apparatus configured to analyze a captured image received from the network camera via the network. The captured image received from the network camera is input into the client apparatus via the acquisition unit 110. After performing the image analysis processing that will be described below, the analysis apparatus 100 outputs an analysis result to a display unit of the client apparatus. The analysis result is output from the I/F unit 160 to the display unit. Further, the I/F unit 160 acquires a setting command for performing the analysis processing from an input device such as a mouse and a keyboard connected to the client apparatus. For example, the I/F unit 160 acquires setting information of an analysis graphic specified by a user with use of the input device such as the mouse and the keyboard. The control unit 150 sets the received setting information to the analysis unit 120. The analysis unit 120 performs the image analysis processing, which will be described below, based on the setting value set by the control unit 150. The analysis apparatus 100 and the display unit may be configured integrally as a single apparatus.

Figure 2:
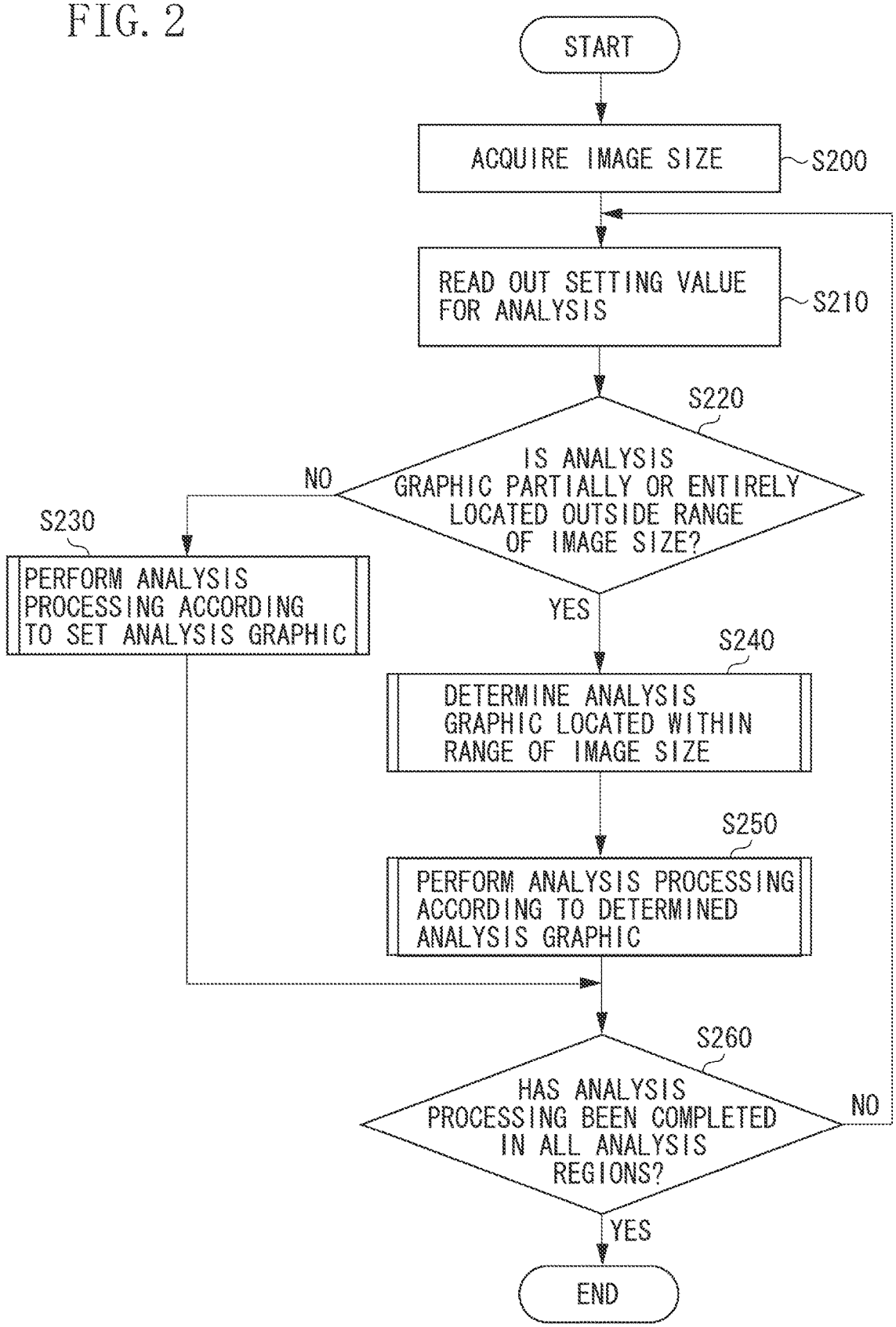
FIG. 2 is a flowchart illustrating a flow of an operation of a control unit according to the first exemplary embodiment of the present invention.

Next, an operation of the analysis apparatus 100 according to the present exemplary embodiment will be described with reference to FIG. 2. If the analysis apparatus 100 is configured in such a manner that the control unit 150 thereof includes a built-in processor, a processing flow illustrated in FIG. 2 indicates a program for causing the control unit 150 to execute a procedure illustrated in FIG. 2. The processor included in the control unit 150 of the analysis apparatus 100 is a computer, and executes the program read out from the storage unit 140 included in the analysis apparatus 100.

Upon a startup of the analysis apparatus 100, in step S200, the control unit 150 performs control for acquiring the image size of the image data input into the analysis apparatus 100 via the acquisition unit 110. The acquisition unit 110 may be configured to acquire the image size of the image data when a change occurs in the image size of the image data input into the analysis apparatus 100 (the image data acquired by the acquisition unit 110).

Subsequently, in step S210, the control unit 150 reads out the setting value of the analysis graphic set by the setting unit 130 and stored in the storage unit 140, from the storage unit 140.

Subsequently, in step S220, the control unit 150 compares the image size of the currently input image data with the setting value of the analysis region acquired in step S210 to determine whether the analysis graphic is partially or entirely set outside the display range of the input image data. In other words, the control unit 150 determines whether the analysis graphic is entirely contained within the display range of the input image data.

Now, an example in which the analysis graphic is partially or entirely set outside the display range of the input image data will be described. As described above, the setting unit 130 can set the analysis graphic within a range of a larger image size among the image sizes of the plurality of image data acquired by the acquisition unit 110. For example, in the example illustrated in FIG. 3, the setting unit 130 can set the analysis region or the detection line within the range of the rectangular frame 300. If the image data having the image size indicated by the rectangular frame 310 is input into the analysis apparatus 100, the setting unit 130 can partially or entirely set the analysis region, or the detection line, in the region (the shaded portion illustrated in FIG. 3) inside the range of the rectangular frame 300 but outside the range of the rectangular frame 310.

The control unit 150 can make the determination in step S220 based on the coordinate system described above with reference to FIG. 3, a region of a rectangular frame that indicates the image size of the input image data in the coordinate system, and a position of the analysis graphic in the coordinate system. Examples of the position of the analysis graphic include coordinates of a vertex of the analysis region and coordinates of both ends of the detection line.

If the analysis graphic is entirely contained within the range of the image size of the input image data (NO in step S220), in step S230, the control unit 150 causes the analysis unit 120 to perform the analysis processing with use of the analysis graphic indicated by the setting value read out in step S210. In other words, the control unit 150 instructs the analysis unit 120 to perform the analysis processing within the range of the analysis region based on the setting value stored in the storage unit 140. Alternatively, the control unit 150 instructs the analysis unit 120 to perform the passage detection with use of the detection line based on the setting value stored in the storage unit 140.

If the analysis graphic is partially or entirely set outside the range of the image size of the input image data (YES in step S220), in step S240, the control unit 150 adapts the analysis graphic in such a manner that the analysis graphic is contained within the display range of the input image data. For example, the control unit 150 determines a graphic that indicates a region where the display range of the image data currently acquired by the acquisition unit 110, and the analysis region set by the setting unit 130, overlap each other, as the region to be analyzed by the analysis unit 120. Alternatively, for example, the control unit 150 determines a portion of a first detection line set by the setting unit 130 that is contained within the display range of the image data currently acquired by the acquisition unit 110, as a second detection line to be used by the analysis unit 120 in the passage detection. The method for determining the analysis region to be analyzed by the analysis unit 120 will be described below with reference to FIGS. 4A and 4B.

Upon determining the adapted analysis graphic in step S240, in step S250, the control unit 150 instructs the analysis unit 120 to perform the analysis processing with use of the determined analysis graphic. For example, the control unit 150 determines the graphic determined in step S240 as the region where the analysis processing is performed, and instructs the analysis unit 120 to perform the analysis processing. Alternatively, for example, the control unit 150 determines the detection line determined in step S240 as the detection line for performing the passage detection processing, and instructs the analysis unit 120 to perform the analysis processing.

Upon completion of the analysis processing in step S230 or step S250, in step S260, the control unit 150 determines whether all of the analysis processing set by the setting unit 130 have been completed. For example, if a plurality of analysis regions is set by the setting unit 130, the control unit 150 determines whether the analysis processing has been completed in all of the set analysis regions. If there is any analysis region left unanalyzed (NO in step S260), the control unit 150 causes the processing to return to the process of step S210. If the analysis processing has been completed in all of the analysis regions (YES in step S260), the control unit 150 ends the processing.

Next, the process for determining the analysis graphic in step S240 illustrated in FIG. 2 will be described. The process for determining the analysis region in step S240 illustrated in FIG. 2 will be described with reference to FIGS. 4A and 4B. An example illustrated in FIG. 4A indicates that an analysis graphic 400 is set by the setting unit 130 in the range of the rectangular frame 300 that indicates the image data having the image size of 1920×1080 pixels. In the example illustrated in FIG. 4A, the analysis graphic 400 is partially set outside the range of the rectangular frame 310 that indicates the image data having the image size of 1280×960 pixels.

Figure 4A:
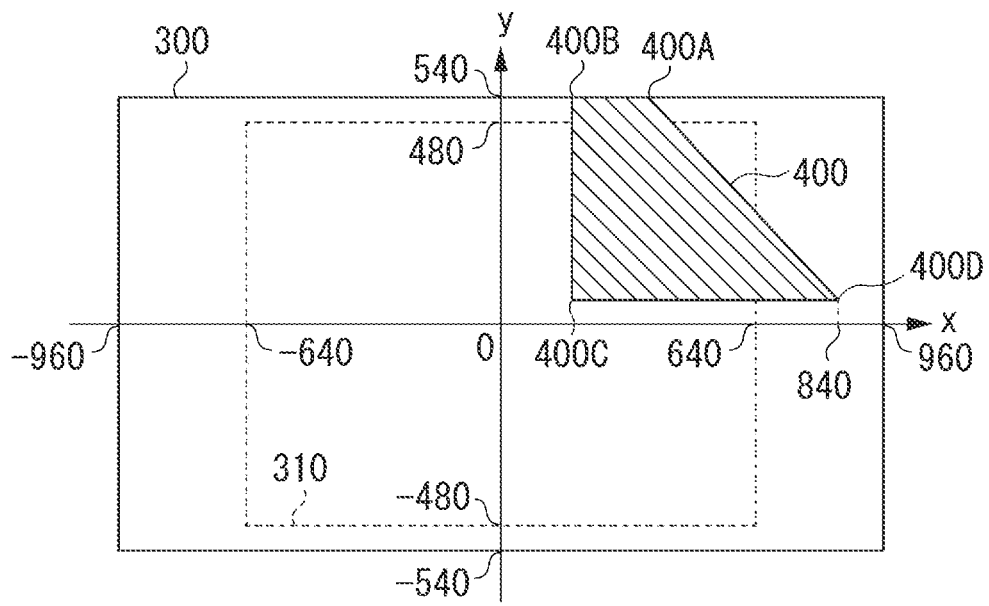
FIGS. 4A and 4B are first and second diagrams illustrating how the analysis region is set according to the first exemplary embodiment of the present invention, respectively.
Figure 4B:
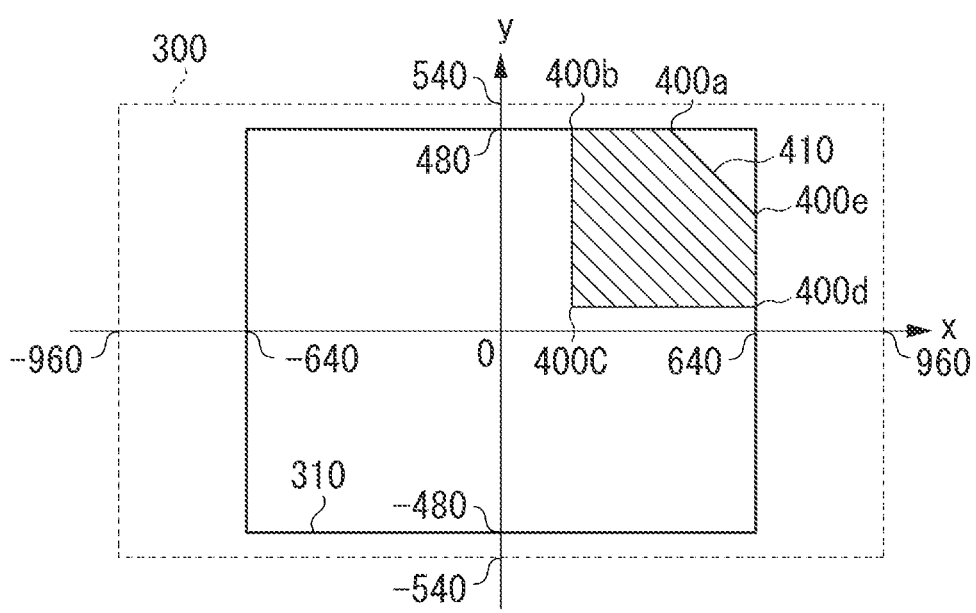

If the analysis apparatus 100 is included in the network camera, FIGS. 4A and 4B each indicate a setting screen displayed on the display unit of the client apparatus connected to the network camera via the network.

However, the rectangular frame 310 indicated by a dotted line in FIG. 4A may not be displayed on the setting screen. Further, the rectangular frame 300 indicated by a dotted line in FIG. 4B may not be displayed on the setting screen.

The analysis apparatus 100 receives setting information (for example, coordinates of a vertex of the analysis graphic) that indicates a position where the analysis graphic 400 is set in the rectangular frame 300, that indicates the range where an analysis graphic can be set, from the client apparatus. For example, the analysis apparatus 100 receives coordinates of a vertex of the analysis graphic 400 illustrated in FIG. 4A. For example, if the display range of the captured image is changed according to an instruction from the client apparatus, the setting unit 130 of the analysis apparatus 100 newly sets an analysis graphic with use of the received setting information. The analysis apparatus 100 transmits information that indicates a position of the newly set analysis graphic in the rectangular frame 310 to the client apparatus. The client apparatus displays the analysis graphic newly set by the analysis apparatus 100 on the display unit. FIG. 4B illustrates an example of a newly set analysis graphic 410 displayed on the display unit at this time.

The control unit 150 can determine whether the analysis graphic 400 is partially set outside the range of the rectangular frame 310 based on, for example, whether a coordinate value of each vertex defining the analysis graphic 400 exceeds each side of the rectangular frame 310.

For example, a horizontal coordinate value (a coordinate on the X axis) of a vertex 400D of the analysis graphic 400 illustrated in FIG. 4A is 840, and this exceeds 640, which is a horizontal coordinate value of the right side of the rectangular frame 310. Therefore, the control unit 150 can determine that the analysis region is partially located outside the range of the rectangular frame 310.

Similarly, in terms of vertexes 400A and 400B of the analysis graphic 400, the control unit 150 can also determine that the analysis region is partially located outside the range of the rectangular frame 310 by comparing a vertical coordinate value (a coordinate on the Y axis) of each vertex with a vertical coordinate value of the rectangular frame 310.

If the image size of the image data currently acquired by the acquisition unit 110 is a size corresponding to the rectangular frame 310, the control unit 150 determines the adapted analysis region in such a manner that the analysis region is contained within the range of the rectangular frame 310 as illustrated in FIG. 4B. More specifically, the control unit 150 acquires intersection points between the respective sides of the analysis graphic 400 and the rectangular frame 310, and determines a region defined by connecting the acquired intersection points and a vertex located within the range of the rectangular frame 310 among the vertexes of the analysis graphic 400, as the analysis graphic 410 where the control unit 150 causes the analysis unit 120 to perform the analysis processing. In the example illustrated in FIG. 4B, the control unit 150 determines a range surrounded by intersection points 400a, 400b, 400d, and 400e between the analysis graphic 400 and the rectangular frame 310, and a vertex 400c located within the range of the rectangular frame 310, as the analysis graphic 410.

Upon determining the analysis graphic 410, where the control unit 150 causes the analysis unit 120 to perform the analysis processing in this manner, in step S250, the control unit 150 instructs the analysis unit 120 to perform the analysis processing on the image data within the region of the new analysis graphic 410.

When determining the detection line as the analysis graphic, the control unit 150 can also determine the detection line in such a manner that the detection line is contained within the range of the rectangular frame 310, and cause the analysis unit 120 to perform the passage detection processing with use of the determined detection line in a similar manner to the analysis region.

In the present exemplary embodiment, the setting unit 130 can set an analysis graphic within a display range (within the range of the rectangular frame 300 in the example illustrated in FIG. 3) of image data having a larger image size among the plurality of image data having different image sizes that the acquisition unit 110 can acquire. Then, the information that indicates the set analysis graphic is stored in the storage unit 140.

In the present exemplary embodiment, the setting content of the analysis graphic stored in the storage unit 140 is kept unchanged during execution of the processes from steps S200 to S260 described above with reference to FIG. 2. In other words, the information that indicates the analysis graphic stored in the storage unit 140 is held without being changed from the content set by the setting unit 130 within the display range of the image data having a larger image size.

If the analysis graphic read out from the storage unit 140 spreads out of the display range of the image data currently input in the analysis apparatus 100, the control unit 150 modifies or adapts the analysis graphic in such a manner that the analysis graphic is contained within the range of the currently input image data, and then causes the analysis unit 120 to perform the analysis processing thereon.

In this manner, even when the analysis region set by the setting unit 130 is partially or entirely set outside the display range of the image data input to the analysis apparatus 100, it is possible to perform the analysis processing without requiring a user to change the setting of the analysis region.

The example illustrated in FIG. 4 has been described in terms of the setting of the detection region for performing the object detection processing. However, even in terms of the detection line for performing the passage detection processing, the analysis graphic (the detection line) can also be changed in a similar manner. For example, this method can also be employed when the first line formed by connecting a plurality of lines each defined by specifying two end points is set in the frame 300 illustrated in FIG. 4.

Figure 8A:
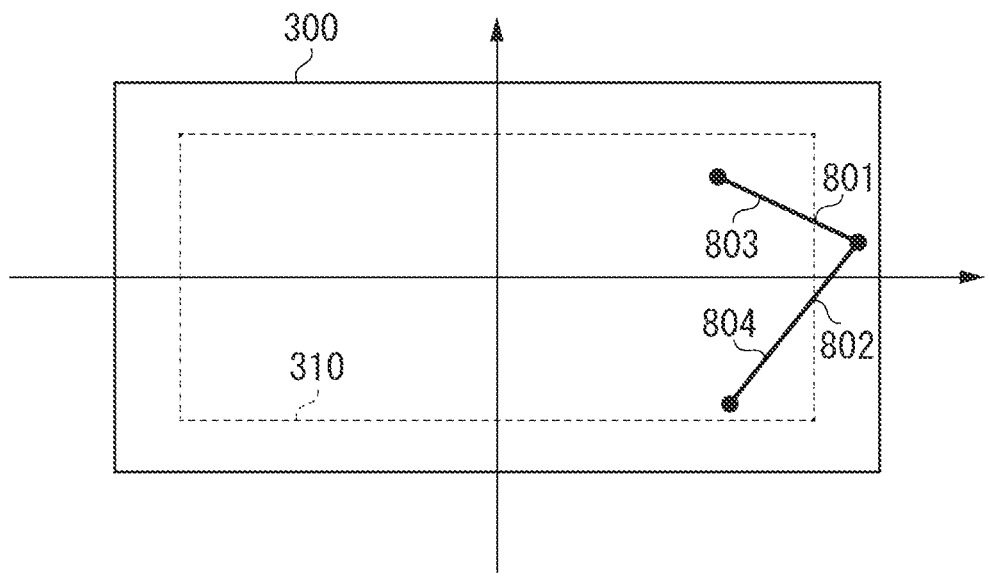
FIGS. 8A and 8B are first and second diagrams illustrating how a detection line is set according to the first exemplary embodiment of the present invention, respectively.
Figure 8B:
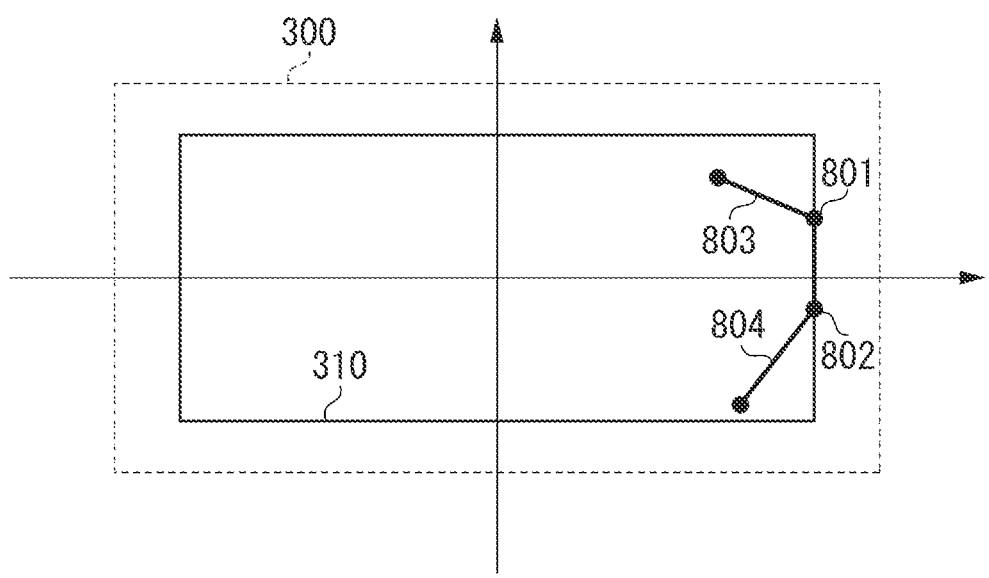

An example of determining an adapted detection line will be described with reference to FIGS. 8A and 8B. FIGS. 8A and 8B each also illustrate an example of the setting screen displayed on the display unit of the client apparatus in a similar manner to FIGS. 4A and 4B. FIG. 8A illustrates a detection line set when the display range is the range of the frame 300. Further, FIG. 8B illustrates the adapted detection line set when the display range is the range of the frame 310. The rectangular frame 310 indicated by a dotted line in FIG. 8A may not be displayed on the setting screen. Further, the rectangular frame 300 indicated by a dotted line in FIG. 8B may not be displayed on the setting screen.

In FIG. 8A, a line 803 and a line 804, each of which is defined by specifying two end points, are connected to form the first line. The line 803 intersects with a side of the rectangular frame 310 at a first point 801. Further, the line 804 intersects with the side of the rectangular frame 310 at a second point 802. When the display range is changed from the frame 300 to the frame 310, the control unit 150 determines a second line defined by the first point 801, the second point 802, and end points set within the range of the rectangular frame 310 among the end points defining the first line. Then, this second line illustrated in FIG. 8B can be determined as the detection line for performing the passage detection processing.

Further, when a first analysis graphic is set within a range of a first image size, then the image size is changed into a second image size smaller than the first image size, and then the image size is further returned to the first image size, the first analysis graphic can be set again. In other words, even if the analysis graphic is changed from the first analysis graphic to a second analysis graphic according to the change in the image size from the first image size to the second image size, the first analysis graphic can be set again when the image size is returned to the first image size.

Referring to the example illustrated in FIGS. 4A and 4B, this case will be described more specifically, assuming that the first analysis graphic 400 to be used to perform the analysis processing is set to the image processing apparatus, and the positional information for identifying the first analysis graphic 400 is stored in the storage unit 140. Suppose that, currently, the range of the frame 310 illustrated in FIG. 4B is used as the display range of the image data, and the analysis graphic 410 is used as the graphic to be used to perform the image analysis. In this situation, if the display range of the image data is changed from a first display range (the frame 310) that does not contain at least one vertex among the vertexes of the first analysis graphic 400 to a second display range (the frame 300) that contains the first analysis graphic 400, the first analysis graphic 400 is determined as the analysis graphic. The analysis graphic is determined based on the positional information stored in the storage unit 140.

According to this method, it is possible to perform the analysis processing with use of the second analysis graphic 410 contained within the first display range, while the first display range (the frame 310) is displayed, and perform the analysis processing with use of the first analysis graphic 400 after the display range is switched to the second display range 300. In this manner, it is possible to perform the analysis processing without requiring the user to change the setting of the analysis region.

In this manner, according to the present exemplary embodiment, the user can set the analysis graphic to be used, and the analysis unit 120 performs the analysis processing, of the analysis apparatus 100, on the image data having a plurality of different image sizes, with ease.

The detection line used as the analysis graphic may be a polygonal line, which is not closed as a polygon. Further, if there is a limitation on the setting of coordinate values of the analysis graphic, the setting value may be corrected so as to satisfy the limitation. For example, suppose that there is a limitation that prohibits coordinates of a vertex of the analysis graphic from being set unless it is set based on eight pixels instead of a single pixel. In this case, even if an intersection point with a rectangular frame defining the imaging range cannot have a coordinate value based on eight pixels, the analysis graphic can be set while satisfying the setting limitation by, for example, rounding off the value of the coordinate of the intersection point.

A second exemplary embodiment will be described as analysis processing when there is an upper limit on the number of vertexes of a settable analysis graphic. The number of vertexes of an analysis graphic means, for example, the number of vertexes of the analysis region if the analysis graphic is the above-described analysis region. Further, in the present exemplary embodiment, the number of vertexes of an analysis graphic includes the number of end points defining a line defined by specifying two end points, or a line formed by connecting a plurality of lines each defined by specifying two end points, if the analysis graphic is the above-described detection line.

For example, the present exemplary embodiment describes a case where the upper limit on the number of vertexes of a settable analysis graphic is 4, which is an example of having an upper limit on the number of vertexes of a settable analysis graphic.

In the example illustrated in FIG. 4A, the number of vertexes of the analysis graphic 400 stored in the storage unit 140 is 4. However, the number of vertexes of the analysis graphic 410, after the control unit 150 has determined the new analysis region, is increased to 5, as illustrated in FIG. 4B. In this case, the number of vertexes of the adapted analysis region determined by the control unit 150 exceeds the upper limit on the number of vertexes of a settable analysis graphic.

The present exemplary embodiment will be described as an example in which the analysis apparatus 100 performs the analysis processing while preventing the number of vertexes of the analysis graphic, after the control unit 150 determines the adapted analysis region in this manner, from exceeding the upper limit value on the number of vertexes of an analysis graphic.

The analysis apparatus 100 according to the present exemplary embodiment is similarly configured to the first exemplary embodiment described above with reference to FIG. 1, and therefore a description thereof will be omitted.

An operation of the analysis processing according to the present exemplary embodiment is different from the series of processes according to the first exemplary embodiment described above with reference to FIG. 2, in that the process for determining the analysis graphic in step S240 is performed by a different method. The other processes are similar to the contents according to the first exemplary embodiment described above with reference to FIG. 2, and therefore descriptions thereof will be omitted.

The process for determining the analysis graphic (step S240 illustrated in FIG. 2) according to the present exemplary embodiment will be described with reference to FIG. 5. The present exemplary embodiment will be described based on an example in which one vertex, among the vertexes of the analysis graphic set in the setting range 300, is set outside the range of the rectangular frame 310 that indicates the display range of the image data, and the other vertexes of the analysis graphic are set within the display range defined by the rectangular frame 310.

Figure 5:
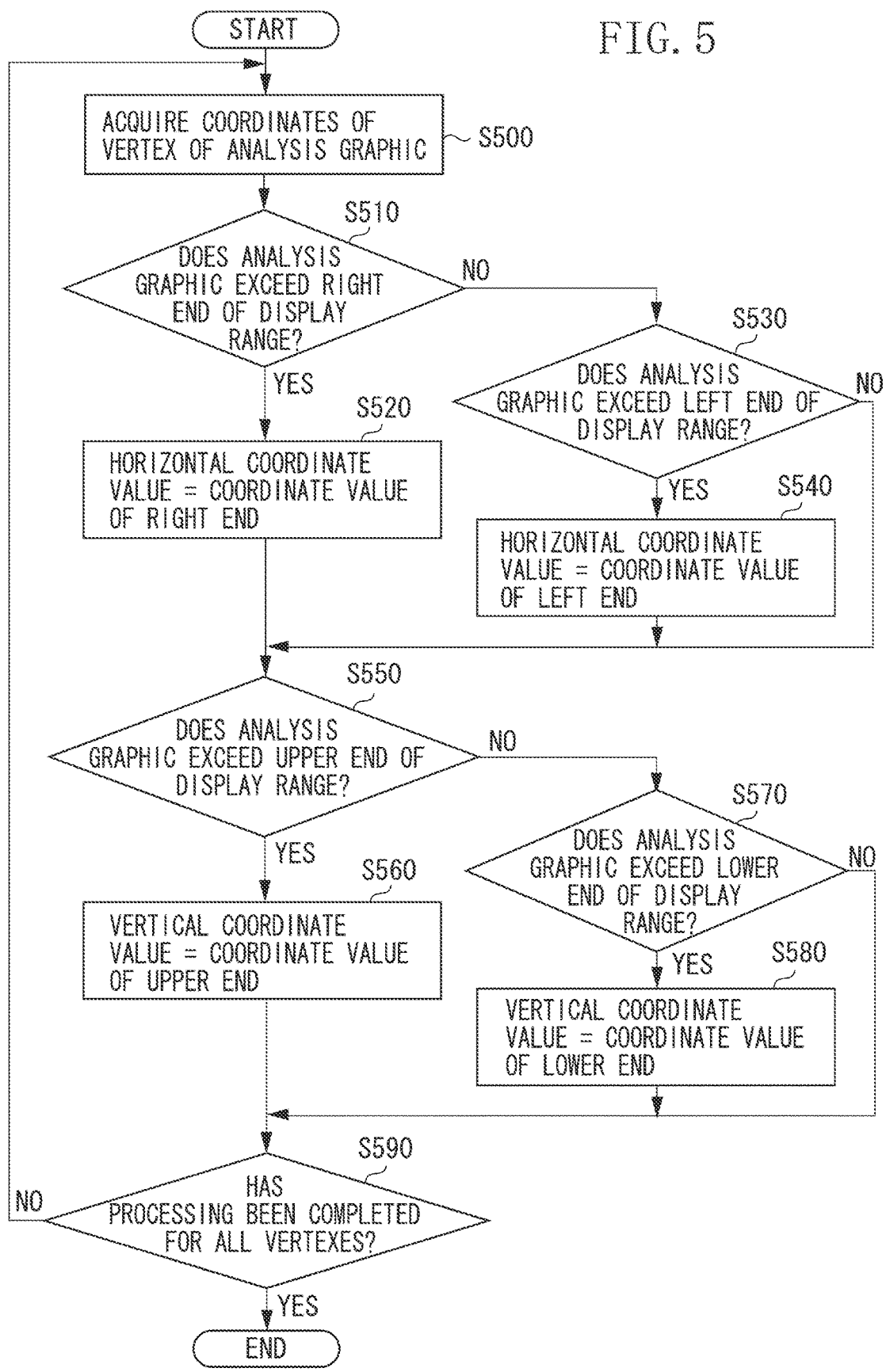
FIG. 5 is a flowchart illustrating a flow of an operation of a control unit according to a second exemplary embodiment of the present invention.

If the analysis apparatus 100 is configured in such a manner that the control unit 150 thereof includes a built-in processor, a processing flow illustrated in FIG. 5 indicates a program for causing the control unit 150 to execute a procedure illustrated in FIG. 5. The processor included in the control unit 150 of the analysis apparatus 100 is a computer, and executes the program read out from the storage unit 140 included in the analysis apparatus 100.

First, in step S500, the control unit 150 acquires coordinates of one vertex among the vertexes of the analysis graphic set by the setting unit 130 within the setting range described above according to the first exemplary embodiment.

Subsequently, in step S510, the control unit 150 determines whether the vertex of the analysis graphic is set outside the current display range of the captured image. In the example illustrated in FIG. 5, the control unit 150 determines whether the position of the vertex acquired in step S500 exceeds a right end of the rectangular frame that indicates the display range.

If the position of the acquired vertex exceeds the right end of the rectangular frame that indicates the display range (YES in step S510), in step S520, the control unit 150 changes a horizontal coordinate of this vertex so as to be contained within a range of horizontal coordinates of the rectangular frame 310 that indicates the display range. In the example illustrated in FIG. 5, the control unit 150 changes the horizontal coordinate of the vertex acquired in step S500 so as to match a horizontal coordinate of the right end of the rectangular frame 310 that indicates the display range. This step is not limited to changing the horizontal coordinate of the vertex so as to match the horizontal coordinate of the right end, and may be performed in any manner as long as the horizontal coordinate of the vertex can be changed so as to be contained within the display range.

Figure 6A:
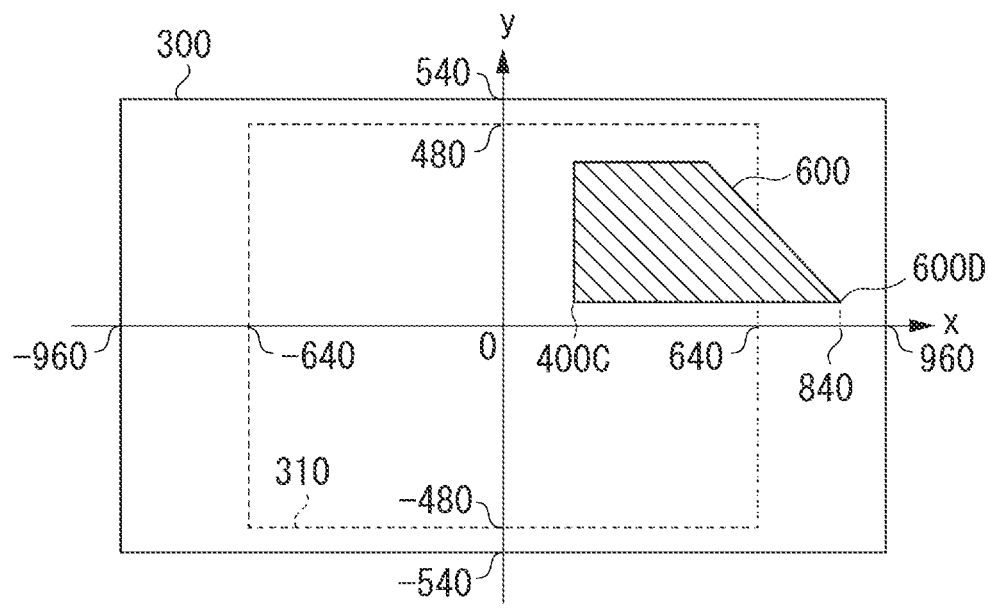
FIGS. 6A and 6B are first and second diagrams illustrating how the analysis region is set according to the second exemplary embodiment of the present invention, respectively.

FIG. 6A illustrates that one vertex among vertexes of an analysis graphic 600 set in the rectangular frame 300, that indicates the display range of the image data (the second image data) having the image size of 1920×1080 pixels, is set outside the range of the rectangular frame 310. In the example illustrated in FIG. 6A, the other vertexes of the analysis graphic 600 are set within the range of the rectangular frame 310. In this example, the rectangular frame 300 may be the frame that indicates the imageable range where the imaging apparatus can capture an image.

Figure 6B:
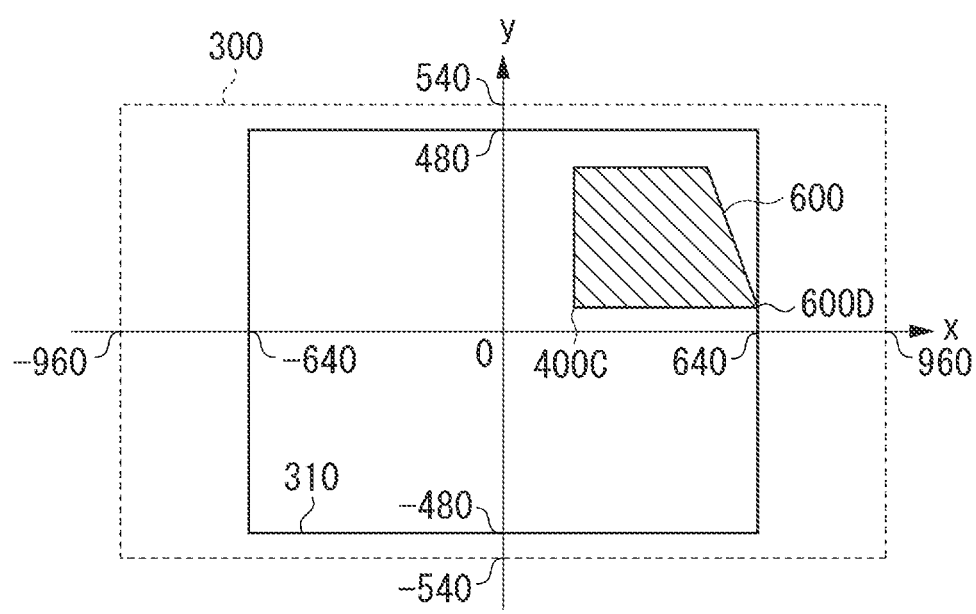

If the analysis apparatus 100 is included in the network camera, FIGS. 6A and 6B each indicate a setting screen displayed on the display unit of the client apparatus connected to the network camera via the network.

However, the rectangular frame 310 indicated by a dotted line in FIG. 6A may not be displayed on the setting screen. Further, the rectangular frame 300 indicated by a dotted line in FIG. 6B may not be displayed on the setting screen.

An example in which the control unit 150 acquires coordinates of a vertex 600D in step S500 will be described with reference to FIG. 6A. In step S510, the control unit 150 determines whether a horizontal coordinate (X=840) of the vertex 600D exceeds a horizontal coordinate (X=640) of a right end of the rectangular frame 310, which indicates the display range, in the X direction. In the example illustrated in FIG. 6A, since the vertex 600D exceeds the right end of the display range (YES in step S510), the control unit 150 changes the horizontal coordinate of the vertex 600D so as to be contained within a range ($-640 \leq X \leq 640$) of horizontal coordinates of the rectangular frame 310 that indicates the display range. For example, the control unit 150 sets the horizontal coordinate of the vertex 600D to X=640.

If the position of the vertex acquired in step S500 does not exceed the right end of the display range (NO in step S510), in step S530, the control unit 150 determines whether the position of the vertex acquired in step S500 exceeds a left end of the display range.

If the position of the vertex acquired in step S500 exceeds the left end of the display range (YES in step S530), in step S540, the control unit 150 changes the horizontal coordinate of this vertex so as to be contained within the range of the rectangular frame that indicates the display range. In the example illustrated in FIG. 5, the control unit 150 changes the horizontal coordinate of the vertex acquired in step S500 so as to match the horizontal coordinate of the left end of the rectangular frame that indicates the display range. This step is not limited to changing the horizontal coordinate of the vertex in such a manner that it matches the horizontal coordinate of the left end, and may be performed in any manner as long as the horizontal coordinate of the vertex can be changed so as to be contained within the display range.

If the horizontal coordinate of the vertex acquired in step S500 is contained within the range of the frame that indicates the display range (NO in step S530), if the control unit 150 has performed the process of step S520, or if the control unit 150 has performed the process of step S540, the control unit 150 performs the process of step S550.

In step S550, the control unit 150 determines whether the position of the vertex acquired in step S500 exceeds an upper end of the rectangular frame that indicates the display range. If the position of the acquired vertex exceeds the upper end of the rectangular frame that indicates the display range (YES in step S550), in step S560, the control unit 150 changes a vertical coordinate of this vertex so as to be contained within a range of vertical coordinates of the rectangular frame that indicates the display range. In the example illustrated in FIG. 5, the control unit 150 changes the vertical coordinate of the vertex acquired in step S500 so as to match a vertical coordinate of the upper end of the rectangular frame that indicates the display range. This step is not limited to changing the vertical coordinate of the vertex so as to match the vertical coordinate of the upper end, and may be performed in any manner as long as the vertical coordinate of the vertex can be changed so as to be contained within the display range.

If the position of the vertex acquired in step S500 does not exceed the upper end of the display range (NO in step S550), in step S570, the control unit 150 determines whether the position of the vertex acquired in step S500 exceeds a lower end of the display range.

If the position of the vertex acquired in step S500 exceeds the lower end of the display range (YES in step S570), in step S580, the control unit 150 changes the vertical coordinate of this vertex so as to be contained within the range of the rectangular frame that indicates the display range. In the example illustrated in FIG. 5, the control unit 150 changes the vertical coordinate of the vertex acquired in step S500 so as to match a vertical coordinate of the lower end of the rectangular frame that indicates the display range. This step is not limited to changing the vertical coordinate of the vertex so as to match the vertical coordinate of the lower end, and may be performed in any manner as long as the vertical coordinate of the vertex can be changed so as to be contained within the display range.

If the control unit 150 determines that the position of the vertex acquired in step S500 does not exceed the lower end of the display range (NO in step S570), if the control unit 150 has performed the process of step S580, or if the control unit 150 has performed the process of step S560, the control unit 150 performs the process of step S590.

In step S590, the control unit 150 determines whether the processes from step S500 to step S590 have been performed for all of the vertexes of the analysis graphic. If there is any vertex left unprocessed (NO in step S590), the control unit 150 causes the processing to return to step S500, and repeats the processing starting from step S500 for this unprocessed vertex.

If the control unit 150 determines in step S590 that the processing has been performed for all of the vertexes of the analysis graphic (YES in step S590), the control unit 150 ends the processing.

FIG. 6B illustrates the (adapted) analysis graphic 600 reset after completion of the processing illustrated in FIG. 5, when the analysis graphic 600 is specified in a shaded portion illustrated in FIG. 6A. The analysis graphic illustrated in FIG. 6B shows how the vertex, set outside the range of the rectangular frame 310 that indicates the display range of FIG. 6A, is displaced into the range of the rectangular frame 310, and also shows the other vertexes set within the range of the rectangular frame 310.

The example illustrated in FIG. 6A has been described assuming that a graphic defined by four vertexes is used as the analysis graphic 600. However, the analysis graphic 600 may be a line defined by specifying two end points, or a line formed by connecting a plurality of lines each defined by specifying two end points. Then, the control unit 150 may determine whether the end points defining this line (the first line) is contained within the range of the rectangular frame 310 according to the processing illustrated in FIG. 5.

Figure 9A:
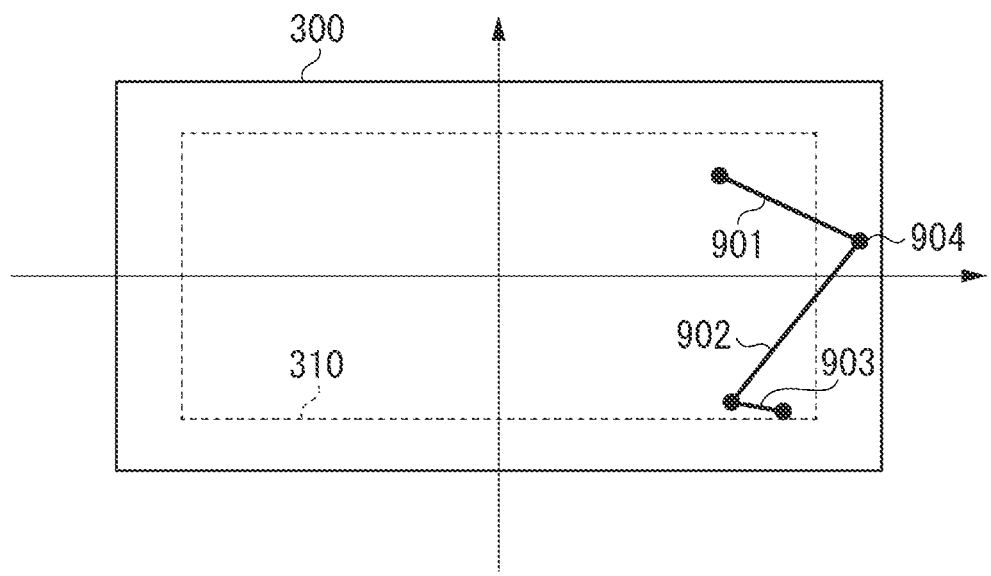
FIGS. 9A and 9B are first and second diagrams illustrating how the detection line is set according to the second exemplary embodiment of the present invention, respectively.
Figure 9B:
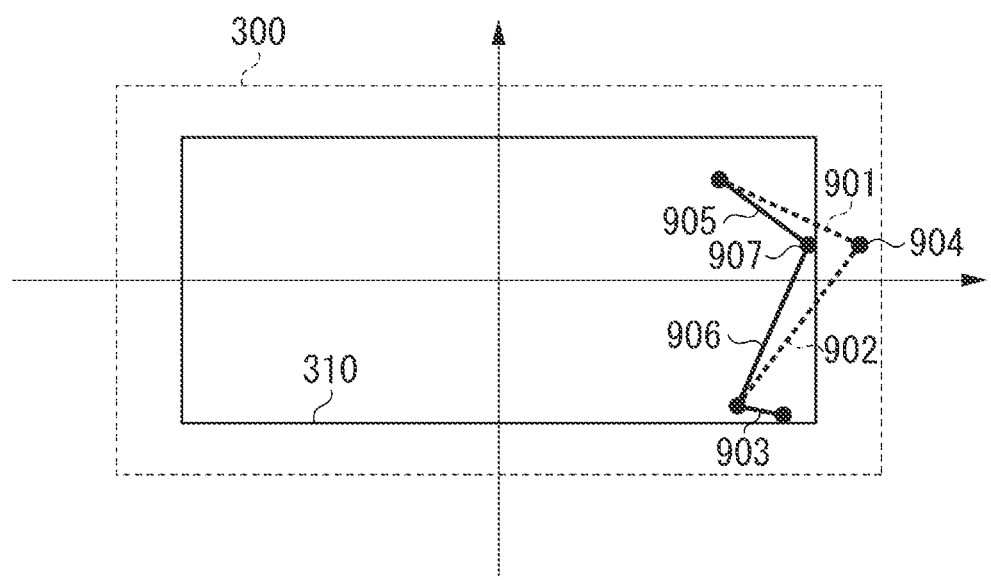

An example of determining the detection line will be described with reference to FIGS. 9A and 9B. FIGS. 9A and 9B each illustrate an example of a setting screen displayed on the display unit of the client apparatus in a similar manner to FIGS. 6A and 6B. However, the rectangular frame 310 indicated by a dotted line in FIG. 9A may not be displayed on the setting screen. Further, the rectangular frame 300 indicated by a dotted line in FIG. 9B may not be displayed on the setting screen.

Description is given of a case where a single end point 904 is set outside the range of the rectangular frame 310 among respective end points of the first line specified within the range of the frame 300, and the other end points of the first line are set within the range of the frame 310. The first line illustrated in FIG. 9A includes a line 901, a line 902, and a line 903. FIG. 9B illustrates an example of the detection line set when the display range is changed from the frame 300 to the frame 310. The second line is defined by an end point 907 generated by displacing the end point 904 set outside the range of the rectangular frame 310 into the range of the rectangular frame 310, and the end points set within the range of the rectangular frame 310, and this second line is determined as the detection line for performing the passage detection processing. The second line includes a line 905, a line 906, and a line 903.

In this manner, the analysis graphic 600 can be set within the range of the rectangular frame 310 that indicates the display range, while making an arrangement in such a manner that the number of vertexes of the newly set analysis graphic 600 matches the number of vertexes of the original analysis graphic 600. In other words, the second analysis graphic illustrated in FIG. 6B, which has the number of vertexes equal to or smaller than the number of vertexes of the first analysis graphic 600 illustrated in FIG. 6A, and is contained within the rectangular frame 310, can be determined as the region or the detection line for performing the analysis processing.

The example illustrated in FIG. 5 has been described assuming that the control unit 150 determines whether each vertex of the analysis graphic exceeds the imageable range in the order of the right end, the left end, the upper end, and the lower end of the imageable range. However, this determination order is not limited to the order illustrated in FIG. 5, and can be changed.

Figure 7A:
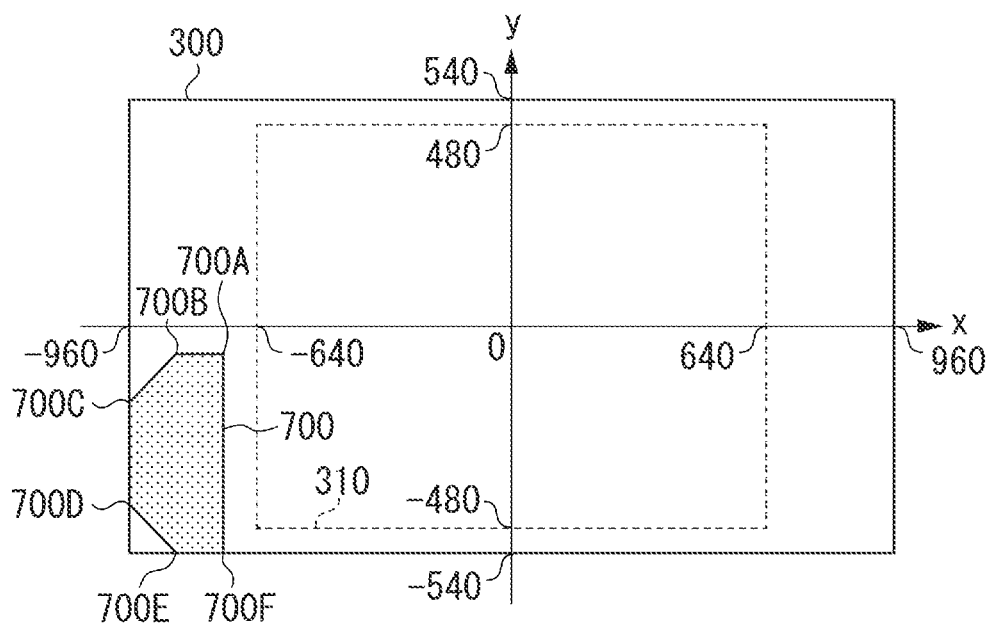
FIGS. 7A and 7B are first and second diagrams illustrating that an analysis graphic 700 is set outside a rectangular frame 310, respectively.
Figure 7B:
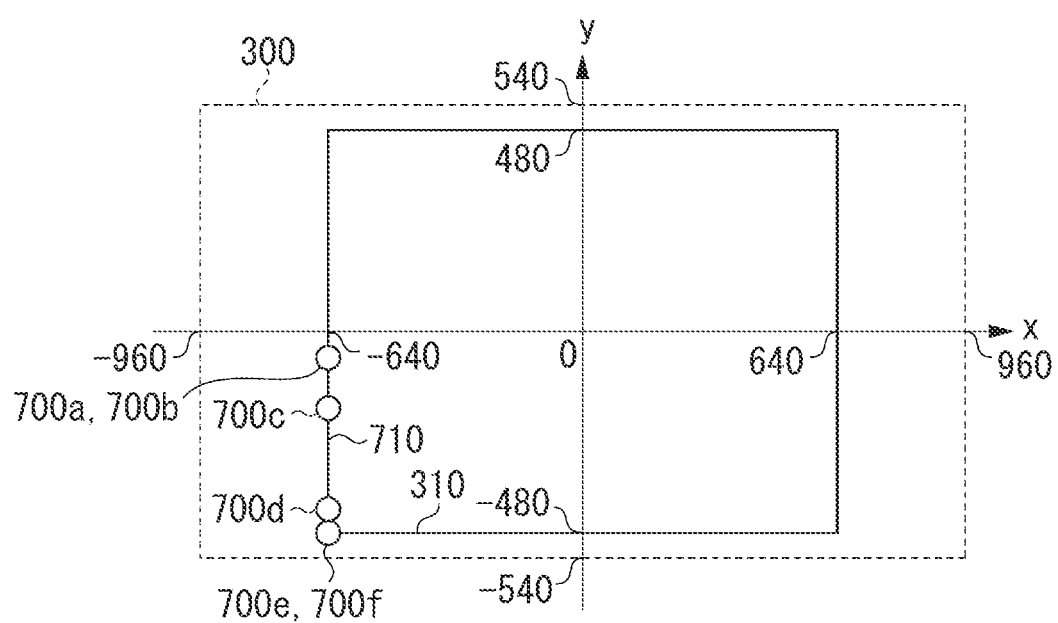

Next, an example in which the analysis graphic is set outside the display range will be described with reference to FIGS. 7A and 7B. FIG. 7A illustrates that an analysis graphic 700 is set outside the rectangular frame 310 that indicates the display range. FIG. 7B illustrates a result after the series of processes described above with reference to FIG. 5 is performed at this time.

If the analysis apparatus 100 is included in the network camera, FIGS. 7A and 7B each indicate a setting screen displayed on the display unit of the client apparatus connected to the network camera via the network.

However, the rectangular frame 310 indicated by a dotted line in FIG. 7A may not be displayed on the setting screen. Further, the rectangular frame 300 indicated by a dotted line in FIG. 7B may not be displayed on the setting screen.

Vertexes 700a to 700f illustrated in FIG. 7B are vertexes replaced from vertexes 700A to 700F illustrated in FIG. 7A, respectively. In FIG. 7B, the vertex 700a and the vertex 700b have a same coordinate value. Further, the vertex 700e and the vertex 700f have a same coordinate value. In this manner, when the analysis region is entirely set outside the display range, a line that indicates the presence of the analysis graphic can be displayed on a line of the frame that indicates the display range.

In this manner, when a first graphic to be used to determine the range where the detection processing is performed is entirely set outside the range of the frame 310 that indicates the display range, the present exemplary embodiment displays a second graphic, which indicates that the first graphic is entirely set outside the range of the rectangular frame 310, on a side of the rectangular frame 310.

Alternatively, when a line defined by specifying two end points, or a line formed by connecting a plurality of lines each defined by specifying two end points, in the imageable range of the imaging unit that acquires the captured image is entirely set outside the range of the rectangular frame 310, similar processing can be performed. More specifically, a graphic indicating that the first graphic is entirely set outside the range of the rectangular frame 310 is displayed on a side of the rectangular frame 310.

The control unit 150 illustrated in FIG. 1 can perform this display control processing on the display device via the I/F unit 160.

This display allows the analysis apparatus 100 to visually indicate that the analysis region is set outside the frame of the display range to the user. This display is not limited to drawing a line that indicates the presence of the analysis graphic on a frame line of the display range, and may be provided by displaying only points that indicate the respective vertexes after the displacement.

The present exemplary embodiment and the operation of the first exemplary embodiment are not mutually exclusive, and may be combined with each other. For example, when the number of vertexes of a region where the rectangular frame 310 and the analysis graphic 600 illustrated in FIG. 6A overlap each other does not exceed the number of settable vertexes, a graphic (a third graphic) that indicates this overlap region is determined as the region where the analysis processing is performed. This third graphic is a graphic that indicates a region defined by connecting the intersection points between the respective sides of the analysis graphic 600 and the rectangular frame 310, and the vertexes located within the range of the rectangular frame 310 among the vertexes of the analysis graphic 600 in FIG. 6A. In this manner, when the number of vertexes of the third graphic is a predetermined number or smaller, the third graphic is determined as the region where the analysis processing is performed.

On the other hand, when the number of vertexes of the third graphic exceeds the number of vertexes of an analysis graphic that the analysis apparatus 100 can set, the size of the analysis graphic is changed while making an arrangement so as not to change the number of vertexes of the analysis graphic. In other words, the analysis graphic after the change has a shape illustrated in FIG. 6B. In this manner, when the number of vertexes of the third graphic is larger than the predetermined number, the analysis graphic 600 illustrated in FIG. 6B is determined as the region where the analysis processing is performed.

Alternatively, when adapting an analysis graphic by cutting out regions of the analysis region that spread out of the rectangular frame 310 indicating the display range results, and the number of vertexes of the analysis graphic after the reset exceeds the number of vertexes of an analysis graphic that the analysis apparatus 100 can set, the coordinates of the vertexes after the change may be determined by different methods for each vertex. More specifically, the position after the change may be determined by the method according to the first exemplary embodiment for some vertexes among the vertexes of the set analysis graphic, and the position after the change may be determined by the method according to the second exemplary embodiment for the remaining vertexes. At this time, a combination of a vertex and a method used to change the position of this vertex can be determined according to, for example, a distance between the vertex outside the rectangular frame 310, and the rectangular frame 310 that indicates the display range. For example, the vertex position may be changed by the method described in the second exemplary embodiment, starting from a vertex located away from the rectangular frame 310 among the vertexes of the analysis graphic before the change.

Further, in a similar manner to the first exemplary embodiment, when the display range is changed from the first display range, that does not contain at least one vertex among the vertexes of the first analysis graphic, to the second display range, that contains the first analysis graphic, the first analysis graphic can be determined as the analysis region based on the positional information stored in the storage unit 140. According to this method, it is possible to perform the analysis processing with use of the second analysis graphic contained within the first display range while the first display range is displayed, and perform the analysis processing with use of the first analysis graphic after the display range is switched to the second display range. In this manner, it is possible to perform the analysis processing without requiring the user to change the setting of the analysis region.

The present invention is not limited to these exemplary embodiments, and can be modified and changed in various manners without departing from the present invention. In this manner, it is possible to set the analysis region according to a change in the display range of the captured image to be displayed without requiring the user to perform a cumbersome operation.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-108257 filed May 22, 2013, which is hereby incorporated by reference herein in its entirety.

What is claimed is:

1. An image processing apparatus comprising:
a setting unit configured to set, in a first image, a first graphic corresponding to an area on which an image analysis unit performs image analysis processing; and
a determination unit configured to determine based on the first graphic, in a second image corresponding to a part of the first image, a second graphic corresponding to an area on which the image analysis unit performs image analysis processing and having a shape different from a shape of the first graphic and a number of vertexes equal to or smaller than a number of vertexes of the first graphic, in a case where an image to be displayed on a display unit is changed to the second image from the first image,
wherein, the second image does not include at least a part of the first graphic.

2. The image processing apparatus according to claim 1, wherein, in a case where the determination unit determines that one vertex among the vertexes of the first graphic set in the first image is to be located in the outside of the second image, and two vertexes, each connected to the one vertex with a line, of the first graphic are to be located inside of the second image, the determination unit determines, as the second graphic, a graphic in which a position of the one vertex has been changed with positions of the other vertexes having been unchanged.

3. The image processing apparatus according to claim 1, further comprising a display control unit configured to display a frame that indicates the image and the second graphic on the display unit,
wherein, when the first graphic is entirely set outside the image, the display control unit displays a graphic indicating that the first graphic is entirely set outside the image on a side of the frame indicating the image.

4. The image processing apparatus according to claim 1, further comprising a storage unit configured to store positional information that indicates positions of the respective vertexes of the first graphic in the first image,
wherein, when the setting unit changes the image from the second image that does not contain at least one vertex among the vertexes of the first graphic to the first image that contains the first graphic, the determination unit determines the first graphic as a region where detection processing is performed based on the positional information stored in the storage unit.

5. The image processing apparatus according to claim 1, wherein the determination unit determines the second graphic as a region where detection processing is performed when one vertex among the vertexes of the first graphic is set outside the image, the other vertexes of the first graphic are set within the image, and a number of vertexes of a third graphic that indicates a region where the image and the first graphic overlap each other is larger than a predetermined number, and the determination unit determines the third graphic as the region where the detection processing is performed when the number of vertexes of the third graphic is the predetermined number or smaller.

6. The image processing apparatus according to claim 1, wherein the image analysis processing is object detection processing for detecting an object.

7. The image processing apparatus according to claim 1, wherein the image analysis processing is passage detection processing for detecting that an object has passed a predetermined position.

8. The image processing apparatus according to claim 1, wherein the image analysis processing is processing of detecting whether an object is left behind, processing of detecting whether an object is carried away, or processing of detecting whether a mischief is made.

9. The image processing apparatus according to claim 1, wherein a frame of the first image is superimposed on the first graphic on the display unit, and
wherein a frame of the second image is superimposed on the second graphic on the display unit.

10. A method for controlling an image processing apparatus, the method comprising:
setting a first graphic in a first image as a first setting, the first graphic corresponding to an area on which an image analysis unit performs image analysis processing;
setting an image to be displayed on a display unit in the first image, as a second setting; and
determining based on the first graphic, in a second image corresponding to a part of the first image, a second graphic corresponding to an area on which the image analysis unit performs image analysis processing and having a shape different from a shape of the first graphic, and a number of vertexes equal to or smaller than a number of vertexes of the first graphic in a case where an image to be displayed on a display unit is changed to the second image from the first image,
wherein the second range does not include at least a part of the first graphic.

11. The control method according to claim 10, wherein the first setting includes setting the first graphic to be used to determine a range of the first image where detection processing for detecting an object is performed,
wherein the second setting includes setting the image to be displayed on the display unit in the first image, and
wherein the determining includes determining the second graphic having the number of vertexes equal to or smaller than the number of vertexes of the first graphic and contained within the image as a region where the detection processing is performed, when one vertex among the vertexes of the first graphic set in the first image is set outside the image and the other vertexes of the first graphic are set within the image.

12. The control method according to claim 10, wherein the first setting includes setting a line defined by specifying two end points or a line formed by connecting a plurality of lines each defined by specifying two end points in the first image as the first line,
wherein the second setting includes setting the image to be displayed on the display unit in the first image, and
wherein the determining includes, when one end point of the respective end points of the first line set in the first image is set outside the image and the other end point of the first line is set within the image, determining the second line defined by an end point generated by displacing the one end point set outside the image into the image, and the end point set within the image, as a predetermined detection line for performing passage detection processing for detecting that an object has passed across the predetermined detection line.

13. The control method according to claim 10, wherein the first setting includes setting the first line formed by connecting a plurality of lines each defined by specifying two end points in the first image,
wherein the second setting includes setting the image to be displayed on the display unit in the first image, and
wherein the determining includes determining the second line defined by a first point at which a third line included in the first line intersects with a side of the image, a second point at which a fourth line included in the first line intersects with a side of the image, and an end point set within the image among the end points defining the first line, as a predetermined detection line for performing passage detection processing for detecting that an object has passed across the predetermined detection line.

14. A non-transitory recording medium storing a program for causing a computer to perform:
setting a first graphic in an image as a first setting, the first graphic corresponding to an area on which analysis unit performs image analysis processing;
setting an image to be displayed on a display unit in the first image as a second setting; and
determining based on the first graphic, in a second image corresponding to a part of the first image, a second graphic corresponding to an area on which the image analysis unit performs image analysis processing and having a shape different from a shape of the first graphic, having a number of vertexes equal to or smaller than a number of vertexes of the first graphic in a case where an image to be displayed on a display unit is changed to the second image from the first image,
wherein the second image does not include at least a part of the first graphic.

15. The recording medium storing the program according to claim 14, for causing a computer to perform:
setting the first graphic to be used to determine a range of the first image where detection processing for detecting an object is performed in the first setting;
setting the image to be displayed on the display unit in the first image in the second setting; and
determining the second graphic having the number of vertexes equal to or smaller than the number of vertexes of the first graphic and contained within the image as a region where the detection processing is performed, when one vertex among the vertexes of the first graphic set in the first image is set outside the image and the other vertexes of the first graphic are set within the image, in the determining.

16. The recording medium storing the program according to claim 14, for causing a computer to perform:
setting a line defined by specifying two end points or a line formed by connecting a plurality of lines each defined by specifying two end points in the first image as the first line in the first setting;
setting the image to be displayed on the display unit in the second image in the second setting; and
determining, when one end point of the respective end points of the first line set in the first image is set outside the image and the other end point of the first line is set within the image, the second line defined by an end point generated by displacing the one end point set outside the image into the image, and the end point set within the image, as a predetermined detection line for performing passage detection processing for detecting that an object has passed across the predetermined detection line, in the determining.

17. The recording medium storing the program according to claim 14, for causing a computer to perform:
setting the first line formed by connecting a plurality of lines each defined by specifying two end points in the first image in the first setting;
setting the image to be displayed on the display unit in the second image in the second setting; and
determining the second line defined by a first point at which a third line included in the first line intersects with a side of the image, a second point at which a fourth line included in the first line intersects with a side of the image, and an end point set within the image among the end points defining the first line, as a predetermined detection line for performing passage detection processing for detecting that an object has passed across the predetermined detection line, in the determining.

18. An image processing apparatus comprising:
a setting unit configured to set, in a first image, a first line being line with which an image analysis unit performs passage detection processing for detecting whether an object has passed across a position corresponding to the first line in the first image; and
a determination unit configured to determine based on the first line, in a second image corresponding to a part of the first image, a second line having a shape different from a shape of the first line, so as not to increase a number of vertexes, in a case where an image to be displayed on a display unit is changed to the second image from the first image, the second image not including at least a part of the first line, the second line being a line with which the image analysis unit performs passage detection processing for detecting whether an object has passed across a position corresponding to the second line in the second image.

19. The image processing apparatus according to claim 18,
wherein, in a case where the determination unit determines that one end point among end points of the lines included in the first line is to be located in the outside of the second image and two end points each connected to the one end point with a line are to be located in the inside of the second image, the determination unit determines, as the second line, a line in which the one end point has been changed with the other end points of the lines having been unchanged.

20. The image processing apparatus according to claim 18,
wherein the setting unit sets the first line formed by connecting a plurality of lines each defined by specifying two end points in the first image, and sets the image to be displayed on the display unit in the first image, and
wherein the determination unit determines the second line defined by a first point at which a third line included in the first line intersects with a side of the image, a second point at which a fourth line included in the first line intersects with a side of the image, and an end point set within the image among the end points defining the first line, as a predetermined detection line for performing passage detection processing for detecting that an object has passed across the predetermined detection line.

21. The image processing apparatus according to claim 18, further comprising a display control unit configured to display a frame that indicates the image and the second line on the display unit,
wherein, when the first line is entirely set outside the image, the display control unit displays a graphic indicating that the first line is entirely set outside the image on a side of the frame indicating the image.

22. The image processing apparatus according to claim 18, further comprising a storage unit configured to store positional information that indicates positions of the respective end points of the first line, which is the line defined by specifying the two end points or the line formed by connecting the plurality of lines each defined by specifying the two end points, in the first image,
wherein, when the setting unit changes the image from the second image that does not contain at least one end point of the end points of the first line to the first image that entirely contains the first line, the determination unit determines the first line as the detection line for performing the passage detection processing based on the positional information stored in the storage unit.

23. The image processing apparatus according to claim 18,
wherein, a frame of the first image is superimposed on the first line on the display unit, and
wherein a frame of the second image is superimposed on the second line on the display unit.

24. The image processing apparatus according to claim 18,
wherein the first line being formed by connecting a plurality of line segments, the second line being formed by connecting a plurality of line segments, and the second line having a number of line segments equal to or smaller than a number of line segments included in the first line.

25. A method for controlling an image processing apparatus comprising:
setting, in a first image, a first line, the first line being a line with which passage detection processing is performed for detecting whether an object has passed across a position corresponding to the first line in the first image; and
determining based on the first line, in a second image corresponding to a part of the first image, a second line having a shape different from a shape of the first line, so as not to increase a number of vertexes, in a case where an image to be displayed on a display unit is changed to the second image from the first image, the second image not including at least a part of the first line, the second line being a line with which passage detection processing is performed for detecting whether an object has passed across a position corresponding to the second line in the second image.

26. A non-transitory computer readable medium containing instructions which when executed, perform the following steps:
setting, in a first image, a first line, the first line being a line with which passage detection processing is performed for detecting whether an object has passed across a position corresponding to the first line in the first image; and determining based on the first line in a second image, corresponding to a part of the first image, a second line having a shape different from a shape of the first line, so as not to increase a number of vertexes, in a case where an image to be displayed on a display unit is changed to the second image from the first image, the second image not including at least a part of the first line, the second line being a line with which passage detection processing is performed for detecting whether an object has passed across a position corresponding to the second line in the second image.

27. An image processing apparatus comprising:
a setting unit configured to set, in a first image, a first graphic corresponding to an area on which an image analysis unit performs image analysis processing, the first graphic having a plurality of vertexes; and
a determination unit configured to determine, based on the first graphic, in a second image corresponding to a part of the first image, a second graphic corresponding to an area on which the image analysis unit performs image analysis processing,
wherein, in a case where it is determined that a certain vertex among the plurality of vertexes of the first graphic is to be located outside the second image when an image change from the first image to the second image occurs, the determination unit causes the certain vertex to move into the second image for determination as the second graphic.

28. An image processing apparatus comprising:
a setting unit configured to set a first line in a first image, the first line being a line used when an image analysis unit performs passage detection processing that is processing for detecting whether an object has passed across a position corresponding to the first line or not, the first line including a plurality of line segments, each of the plurality of line segments being formed by connection of two points; and
a determination unit configured to determine, based on the first line, a second line in a second image corresponding to a part of the first image, the second line being a line used when an image analysis unit performs passage detection processing that is processing for detecting whether an object has passed across a position corresponding to the second line or not,
wherein, in a case where it is determined that points constituting a certain line segment among the plurality of line segments of the first line is to be located outside the second image when an image change from the first image to the second image occurs, the determination unit causes points constituting the certain line segment to move into the second image for determination as the second line.

* * * * *